US011368351B1

(12) United States Patent
Hollis et al.

(10) Patent No.: US 11,368,351 B1
(45) Date of Patent: Jun. 21, 2022

(54) SIMULATION VIEW NETWORK STREAMER

(71) Applicant: Lockheed Martin Corporation, Bethesda, MD (US)

(72) Inventors: Howell B. Hollis, Orlando, FL (US); Adam R. Breed, Orlando, FL (US); Kevin D. Cartrette, Aurora, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 812 days.

(21) Appl. No.: 15/709,011

(22) Filed: Sep. 19, 2017

(51) Int. Cl.
*H04L 67/131* (2022.01)
*H04L 65/60* (2022.01)
*H04N 21/60* (2011.01)
*H04L 65/10* (2022.01)

(52) U.S. Cl.
CPC ........ *H04L 29/06034* (2013.01); *H04L 65/10* (2013.01); *H04L 65/60* (2013.01); *H04N 21/60* (2013.01)

(58) Field of Classification Search
CPC ... H04L 29/06034; H04L 65/10; H04L 65/60; H04N 21/60
See application file for complete search history.

(56) References Cited

U.S. PATENT DOCUMENTS

| 9,563,723 | B1 | 2/2017 | Breed | |
|---|---|---|---|---|
| 2009/0055754 | A1* | 2/2009 | Finn | H04L 67/38 715/757 |
| 2009/0100351 | A1* | 4/2009 | Bromenshenkel | G06F 3/01 715/757 |
| 2012/0115603 | A1* | 5/2012 | Shuster | A63F 13/50 463/31 |
| 2013/0050260 | A1* | 2/2013 | Reitan | G06F 8/315 345/633 |
| 2013/0104057 | A1* | 4/2013 | Leacock | H04L 12/1827 715/757 |
| 2013/0135303 | A1* | 5/2013 | Densham | G06T 17/00 345/420 |
| 2013/0173531 | A1* | 7/2013 | Rinearson | G06F 16/80 707/608 |
| 2013/0232430 | A1* | 9/2013 | Reitan | G06F 3/0484 715/765 |
| 2014/0198121 | A1* | 7/2014 | Tong | G06T 11/60 345/581 |
| 2016/0259761 | A1* | 9/2016 | Laborczfalvi | G06F 17/2235 |

* cited by examiner

*Primary Examiner* — Nicholas R Taylor
*Assistant Examiner* — Tania M Pena-Santana
(74) *Attorney, Agent, or Firm* — Foley & Lardner LLP

(57) ABSTRACT

A simulation view network streamer is disclosed. A first request is received to generate a first network view stream from a first view that exists in a simulation of a virtual environment. The first view is defined by first view data that identifies a first portion of the virtual environment encompassed by the first view. The first request includes a first destination address of a first output device. A second request is received to generate a second network view stream from a second view that exists in the simulation of the virtual environment concurrently with the first view, the second request including a second destination address of a second output device. A stream of images of the first view is sent to the first output device, and a stream of images of the second view is sent to the second output device.

20 Claims, 12 Drawing Sheets

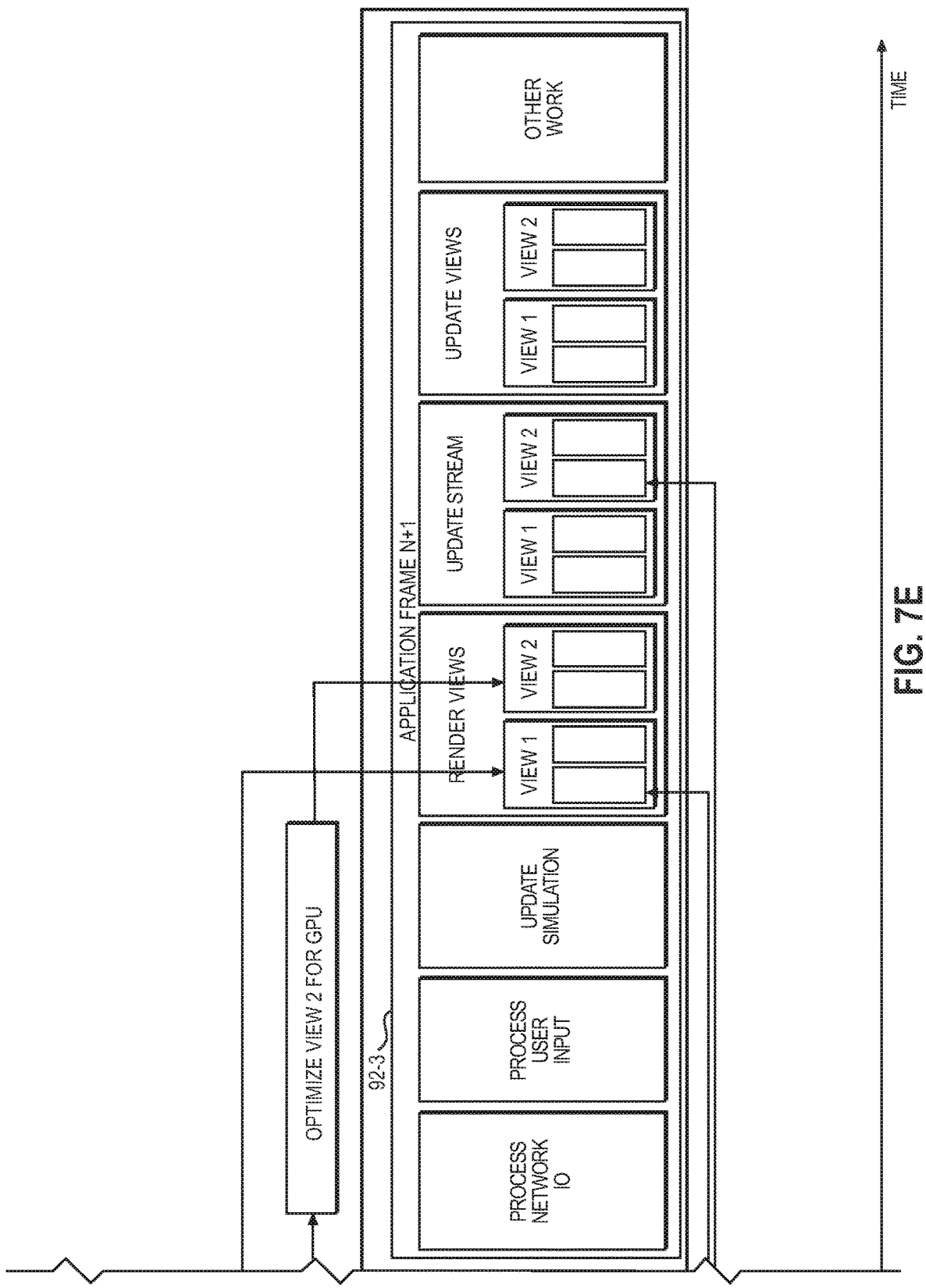

SIMULATION VIEW NETWORK STREAMER

TECHNICAL FIELD

The embodiments relate generally to simulations of virtual environments, and in particular to the on-demand network streaming of a view in a virtual environment during a simulation.

BACKGROUND

A simulation of a virtual environment typically presents a view of the virtual environment to each participant of the simulation. The view may be from the perspective of an object in the virtual environment that represents the participant, such as an entity that moves about the virtual environment in response to input from the participant, or the view may be from the perspective of an object in the virtual environment with which the participant is associated, such as a car, an airplane, or the like.

At times it may be desirable for a view of the virtual environment to be displayed on a network-attached output device. For example, it may be desirable to see simulated video from a simulated drone on an output device capable of receiving real video from a real drone.

It may also be desirable for additional individuals to remotely see the same view as a participant sees. For example, in a training simulation, it may be desirable for an instructor located at a separate output device to view one or more of the views of one or more of the participants in the simulation

SUMMARY

The embodiments facilitate the on-demand network streaming of views that exist in a simulation of a virtual environment. Among other advantages, the embodiments allow a user to request that any view of a multi-participant simulation be sent to any network-attached output device.

In one embodiment, a method for streaming a view in a simulation is provided. The method includes receiving a first request to generate a first network view stream from a first view that exists in a simulation of a virtual environment. The first view is defined by first view data that identifies a first portion of the virtual environment encompassed by the first view, and the first request includes a first destination address of a first output device. The method further includes receiving a second request to generate a second network view stream from a second view that exists in the simulation of the virtual environment concurrently with the first view. The second view is defined by second view data that identifies a second portion of the virtual environment encompassed by the second view, and the second request includes a second destination address of a second output device. The method further includes sending a stream of images of the first view to the first output device and sending a stream of images of the second view to the second output device.

In another embodiment, a computing device is provided. The computing device includes a communications interface and a central processing unit coupled to the communications interface. The central processing unit is configured to receive a first request to generate a first network view stream from a first view that exists in a simulation of a virtual environment. The first view is defined by first view data that identifies a first portion of the virtual environment encompassed by the first view, and the first request includes a first destination address of a first output device. The central processing unit is further configured to receive a second request to generate a second network view stream from a second view that exists in the simulation of the virtual environment concurrently with the first view. The second view is defined by second view data that identifies a second portion of the virtual environment encompassed by the second view, and the second request includes a second destination address of a second output device. The central processing unit is further configured to send a stream of images of the first view to the first output device and send a stream of images of the second view to the second output device.

In another embodiment, a computer program product is provided. The computer program product is stored on a non-transitory computer-readable storage medium and includes instructions to cause a central processing unit to receive a first request to generate a first network view stream from a first view that exists in a simulation of a virtual environment. The first view is defined by first view data that identifies a first portion of the virtual environment encompassed by the first view, and the first request includes a first destination address of a first output device. The instructions are further configured to cause the central processing unit to receive a second request to generate a second network view stream from a second view that exists in the simulation of the virtual environment concurrently with the first view. The second view is defined by second view data that identifies a second portion of the virtual environment encompassed by the second view, and the second request includes a second destination address of a second output device. The instructions are further configured to cause the central processing unit to send a stream of images of the first view to the first output device and send a stream of images of the second view to the second output device.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 7A-7E are diagrams of the processing associated with the generation of several view images and corresponding stream images over the course of several frames.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first output device" and "second output device," and does not imply a priority, a type, an importance, or other attribute, unless otherwise stated herein.

As used herein and in the claims, the articles "a" and "an" in reference to an element refers to "one or more" of the element unless otherwise explicitly specified.

The embodiments facilitate the on-demand network streaming of views that exist in a simulation of a virtual environment. Among other advantages, the embodiments allow a user to request that any view of a multi-participant simulation be sent to any network-attached output device.

Figure 1:
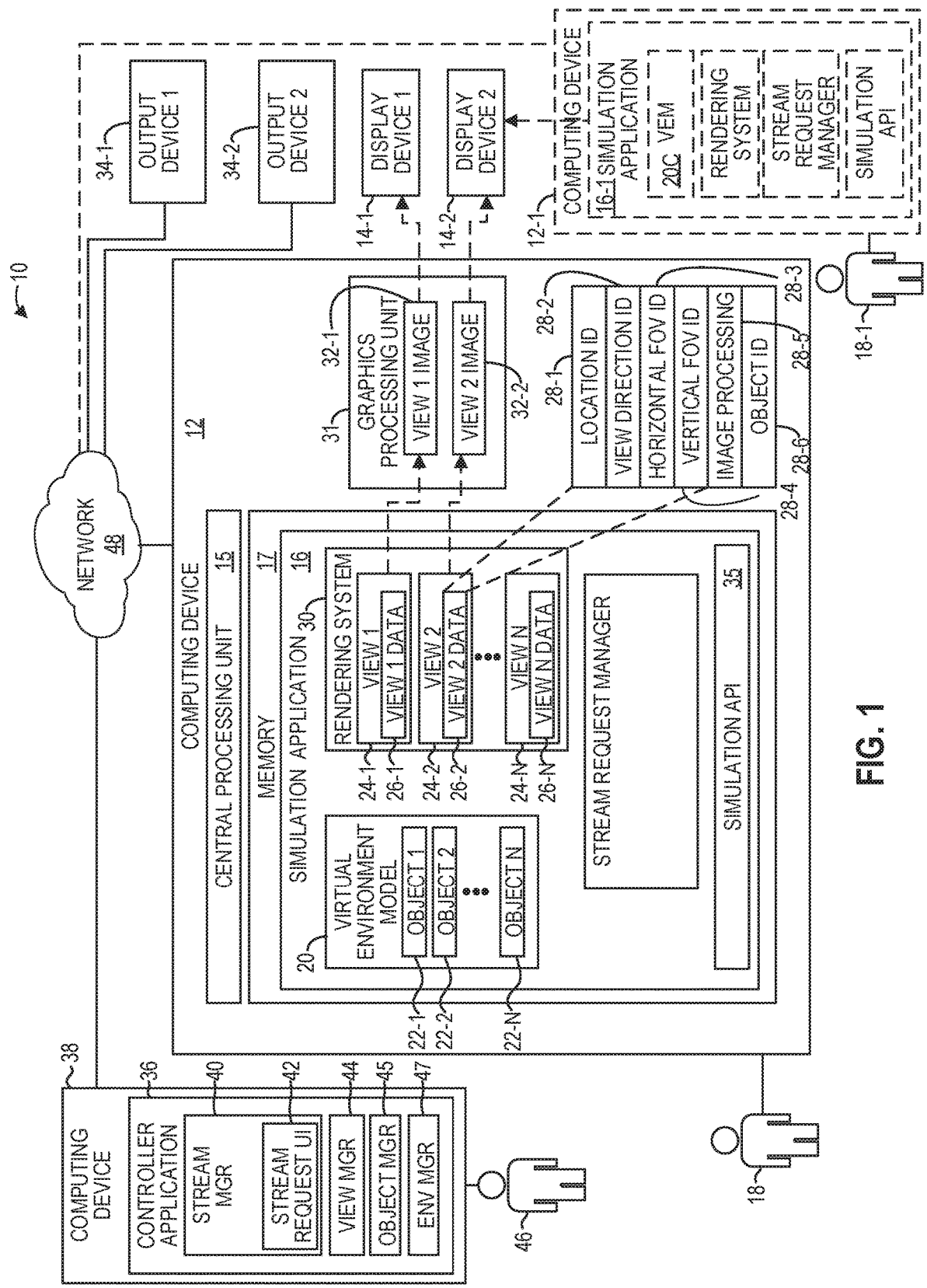
FIG. 1 is a block diagram of a system in which embodiments may be practiced according to one embodiment.

FIG. 1 is a block diagram of a system 10 in which embodiments may be practiced according to one embodiment. The system 10 includes a computing device 12 that is communicatively coupled to one or more display devices 14-1, 14-2 (generally, display devices 14). The computing device 12 includes a central processing unit 15 and a memory 17. The display devices 14 may be separate devices from the computing device 12, such as one or more monitors that are coupled to the computing device 12, or may be integrated with the computing device 12. The computing device 12 includes a simulation application 16 which is configured to provide a simulation of a virtual environment to a user 18. The virtual environment may be in part or in whole defined by a virtual environment model (VEM) 20 that comprises one or more data structures that identify attributes of the virtual environment being simulated, such as information regarding each object in the virtual environment, including the spatial relationships of objects in the virtual environment, locations of the objects in the virtual environment, attributes and characteristics of the objects in the virtual environment, graphical information, and the like.

The VEM 20 may be continually updated during the simulation and reflects a current status of the virtual environment. The updates may occur relatively continuously as objects in the virtual environment move, such as the movement of an airplane object across the sky, the movement of clouds, and the like. Imagery may be generated, based on the VEM 20, that depicts portions of the virtual environment and that may be displayed, by way of non-limiting example, on one or more of the display devices 14.

The VEM 20 maintains data regarding a plurality of objects 22-1, 22-2-22-N (generally, objects 22) that are part of the virtual environment. An object 22 may represent any entity or thing that is part of the virtual environment, such as, by way of non-limiting example, a vehicle, a tree, or an animal. Typically, each human participant in the simulation may be represented as an object in the virtual environment, and may be a particular type of object based on the particular simulation, such as a human object, a car object, or the like.

The simulation application 16 includes a plurality of views 24-1-24-N (generally, views 24). A view 24 may be associated with an object 22 that represents an individual participating in the simulation, or associated with an artificial intelligence (AI) object 22 maintained by the simulation application 16 (such as, for example, an AI airplane flying overhead in the simulation), or an object 22 that is positioned somewhere in the virtual environment (such as a satellite object 22), or may not be associated with any object 22. Imagery associated with a view 24 may be being generated and sent to a local display device 14, or, as described below, streamed to an output device via a network, or may not be being output at all.

A view 24 is defined by view data 26 that identifies a portion of the virtual environment encompassed by the respective view 24. In this example, the view 24-1 is defined by view data 26-1, and the view 24-2 is defined by view data 26-2. The view 24-1 may be associated with the object 22-1 for example, and the view 24-2 may be associated with the object 22-2 for example. The view 24-N may be associated with an AI object 22 that is controlled by the simulation application 16 rather than a human user. The view data 26-2 contains information that identifies a portion of the virtual environment, such as a volume in the virtual environment, which may be perceivable by the corresponding object 22-2. The view data 26-2 may include, by way of non-limiting example, a location identifier (ID) field 28-1 that identifies a location within the virtual environment, a view direction ID field 28-2 that identifies a view direction in the virtual environment with respect to the location, a horizontal field-of-view (FOV) ID field 28-3 that identifies a horizontal FOV associated with the view 24-2, a vertical FOV ID field 28-4 that identifies a vertical FOV associated with the view 24-2, an image processing field 28-5 that identifies one or more image processing filters to be applied to the view 24, and an object ID field 28-6 that identifies an object 22 to which the view 24 corresponds (i.e., to which the view 24 is attached) for those views 24 that are attached to an object 22.

In one embodiment, the contents of the location ID field 28-1 may include, for example, a latitude, longitude, and altitude (LLA) of the corresponding object 22 in degrees/meter. In another embodiment, the contents of the location ID field 28-1 may identify, for example, an X,Y,Z location of the corresponding object 22 from a center of the planet. In one embodiment, the contents of the location ID field 28-1 may include, for example, an LLA of the corresponding object 22 in radians/feet. In another embodiment, the contents of the location ID field 28-1 may identify, for example, an X,Y,Z location of the corresponding object 22 from a center of a second corresponding object 22. In another embodiment, the contents of the location ID field 28-1 may include, for example, the location of a corresponding object 22 which is a look-at target of the view 24, such that the view direction ID field 28-2 is continually updated (i.e., oriented) to ensure that the view 24 remains directed towards such object 22 during the simulation. The precise meaning of the data in the location ID field 28-1, may be designated via a location ID type field of the view data 26-2 (not illustrated).

In one embodiment, the contents of the view direction ID field 28-2 may include, for example, a pitch, bank, and heading (PBH) in degrees relative to the planet surface, or a PBH relative to the planet axis, or may be defined by a quaternion or rotation matrix. In another embodiment, the contents of the view direction ID field 28-2 may include, for example, a PBH in degrees relative to the orientation of another object 22.

The image processing field 28-5 may identify one or more image processing functions to apply to each image generated for the respective view 24. Such image processing functions may include, for example, processing each image such that the view appears to be taken from night vision equipment, processing each image such that the view appears to be taken with infrared equipment, processing each image such that the view is blurred, processing each image such that the view has a bloom, processing each image such that the view has a high dynamic range, and the like.

In this example, assume that the object 22-1 represents a drone. The view 24-1 identifies a view that the drone sees of the virtual environment. The drone may be controlled by the user 18, or may be an AI drone controlled by the simulation application 16. Assume that the object 22-2 represents a human walking in the virtual environment. The view 24-2 identifies the view that the human sees as the human moves about the virtual environment.

The simulation application 16 includes a rendering system 30 that renders view imagery for display on the display device 14-1 based on the view data 26-1. In an example wherein the object 22-1 represents a drone controlled by the user 18, as the user 18 manipulates an input device, such as a keyboard, joystick, or other input device that controls the drone, the simulation application 16 translates such manipulations into movements of the object 22-1 in the virtual environment. The rendering system 30, based on the view data 26-1, in conjunction with a graphics processing unit (GPU) 31, renders, or otherwise generates, imagery, made up of a plurality of successive view images 32-1, and causes the imagery to be displayed on the display device 14-1. The view images 32-1 depict that portion of the virtual environment that is within the view 24-1 defined by the view data 26-1 at a particular instance in time. As the user 18 manipulates the input device, such manipulations may change the location of the object 22-1 in the virtual environment, and/or the view direction of the object 22-1, and thus, portions of the view data 26-1 may change in accordance with such manipulations, such as the location ID and/or the view direction ID. The rendering system 30 continually renders new view images 32-1, based on the updated view data 26-1 and changes in the objects 22, providing the user 18 with a real-time view of the virtual environment seen through the drone that changes in response to manipulations of the object 22-1. It should be noted that any number of views 24 can be output to the display device 14-1, wherein each view 24 can be presented in a separate, re-sizable window.

Similarly, as the user 18 manipulates an input device to control the object 22-2, which, for example, may represent a human, the simulation application 16 translates such manipulations into movements of the object 22-2 in the virtual environment. The rendering system 30, based on the view data 26-2, renders, or otherwise generates, imagery, made up of a plurality of successive view images 32-2, and causes the imagery to be displayed on the display device 14-2. The view images 32-2 depict that portion of the virtual environment that is within the view 24-2 defined by the view data 26-2 at a particular instance in time. As the user 18 manipulates the input device, such manipulations may change the location of the object 22-2 in the virtual environment, and/or the view direction of the object 22-2, and thus, portions of the view data 26-2 may change in accordance with such manipulations, such as the location ID and/or the view direction ID. The rendering system 30 continually renders new view images 32-2, based on the updated core view data 26-2 and changes in the objects 22, providing the user 18 with a real-time view of the virtual environment seen from the perspective of the simulated human that changes in response to manipulations of the object 22-2.

In some embodiments, the views 24 may include one or more observer views as disclosed in U.S. Pat. No. 9,563,723, the contents of which are hereby incorporated herein by reference in their entirety. An observer view, in contrast to a view associated with an object 22, is unassociated with any object 22 in the virtual environment. Moreover, an observer view may be generated in response to real-time input received during the simulation of the virtual environment. Such information may be received, for example, via real-time input entered by a user, such as the user 18. The disclosure herein regarding the views 24 applies equally to observer views.

In some contexts, it may be desirable for an individual that is remote from the display devices 14 to see the imagery associated with the views 24. For example, the simulation of the virtual environment may be a training exercise, and movements of the user 18 may be relevant to an instructor for evaluating the performance of the user 18 and subsequent recommendations to the user 18.

The embodiments facilitate the on-demand, dynamic streaming of any one or more of the views 24 to one or more output devices 34-1-34-2 (generally, output devices 34) upon request. The output devices 34 are network-attached devices that have network addresses such as internet protocol (IP) addresses that uniquely identify them and may include, for example, an encoder/receiver that is coupled to a display device, such as a monitor, a television, or the like. In one embodiment, on-demand, dynamic streaming of any one or more of the views 24 may be facilitated by an application programming interface (API) 35 of the simulation application 16 that allows external applications, such as, in this example, a controller application 36 executing on a computing device 38, to communicate with the simulation application 16 and introduce certain functionality into the system 10 as discussed herein. The phrase "external application" is used herein to refer to an application that is initiated separately from and independent of the simulation application 16. While for purposes of illustration the controller application 36 is illustrated as executing on the computing device 38, in other embodiments the controller application 36 may execute on the computing device 12.

In this example, the controller application 36 implements certain functionality via a stream manager 40, a stream request user interface (UI) 42, a view manager 44, an object manager 45, and an environment manager 47, some, or all, of which may interact with one or more entry points exposed by the simulation API 35 to implement the respective functionality. As will be discussed in greater detail with regard to FIG. 3, below, the stream manager 40 uses the stream request UI 42 to interact with a user 46 to allow the user 46 to initiate, or terminate, one or more network view streams of one or more views 24 to one or more of the output devices 34.

The view manager 44 may be used to direct the simulation application 16 to create a view 24 during a simulation on an ad-hoc and dynamic basis. The newly created view 24 can be attached to a particular object 22, or remain unattached to any object 22. In one embodiment, the view manager 44 presents a UI to the user 46 that identifies a list of existing objects 22 in the simulation. The UI allows the user 46 to select a particular object 22 to which the new view 24 should be attached, and allows the user 46 to identify the data in the location ID field 28-1, the view direction ID field 28-2, the horizontal FOV ID field 28-3, the vertical FOV ID field 28-4, the image processing field 28-5, and the object ID field 28-6, as discussed above. The view 24 can be generated at any time during the simulation on a dynamic, ad-hoc basis.

The UI may also allow the user 46 to create and position a view 24 in the simulation that is not attached to any object 22. The UI may also allow the user 46 to remove a view 24 from the simulation. In one embodiment, a view 24 is generated by first creating a camera object 22, and then attaching the camera object 22 to another object 22. An object 22 may be given multiple views 24. Such views may also be sent to a local display device 14, or not.

The object manager 45 may be used to create an object 22 during a simulation on an ad-hoc and dynamic basis. In one embodiment, the object manager 45 presents a UI to the user 46 that allows the user 46 to identify that a new object 22 should be added to the simulation. The UI may present default types of objects 22, such as a camera object 22, an airplane object 22, a tank object 22, a satellite object 22, and the like. Each default type of object 22 may have preconfigured simulation parameters, such as a default location, a speed, certain AI behavior, and the like. The UI may allow the user 46 to alter any of these default parameters.

The environment manager 47 presents a UI to the user 46 that allows the user 46 to alter the date and time of the simulation, such as to change the season of the simulation, and/or the time within the day of the simulation. The UI may also allow the user 46 to identify a particular type of weather, rain, snow, sunshine, cloud conditions, or the like. Such alterations cause the simulation application 16 to alter the appearance of the virtual environment.

It should be noted that the embodiments are not limited to the use of an API, and other inter-process communication mechanisms may be used.

The computing device 12 may be coupled to a network 48 to facilitate communications with one or more other computing devices, such as the computing device 38, the output devices 34, and a computing device 12-1 that is concurrently involved in the simulation. While for purposes of illustration the display devices 14-1, 14-2 have been illustrated as being associated with the computing device 12 and the user 18, in other embodiments the display devices 14-1, 14-2 may be associated with different computing devices and different users in the simulation, such as the computing device 12 and the computing device 12-1, each of which is being utilized by a different user 18, 18-1 that is participating in the simulation.

The computing device 12-1 also includes a simulation application 16-1 which contains a VEM 20C, which is a copy of the VEM 20 that also reflects the current state of the virtual environment. As the simulation progresses, the computing device 12 and the computing device 12-1 may exchange data that facilitates synchronization of the VEM 20 with the VEM 20C so that the users 18 and 18-1 may perceive substantially identical virtual environments. In this example, the user 18 perceives the virtual environment on the display device 14-1, and the user 18-1 perceives the virtual environment on the display device 14-2. For example, as the user 18 manipulates an input device (not illustrated) to move an object in the virtual environment about the virtual environment, positional data identifying such object movements may be provided by the computing device 12 to the computing device 12-1 via the network 48 so that the VEM 20C may be updated to correctly identify a current position of the object in the virtual environment.

Accordingly, the simulation application 16-1 renders imagery to the user 18-1 on the display device 14-2 substantially in real-time that depicts the movements of the object that is being manipulated by the user 18. Similarly, the user 18-1 may also manipulate an object in the virtual environment, and the computing device 12-1 sends positional data identifying such object movements to the computing device 12 via the network 48 so the VEM 20 may be updated to correctly identify a current position of such object in the virtual environment. While for purposes of illustration only two devices are shown as participating in the simulation, any number of devices may participate in a simulation.

Figure 2:
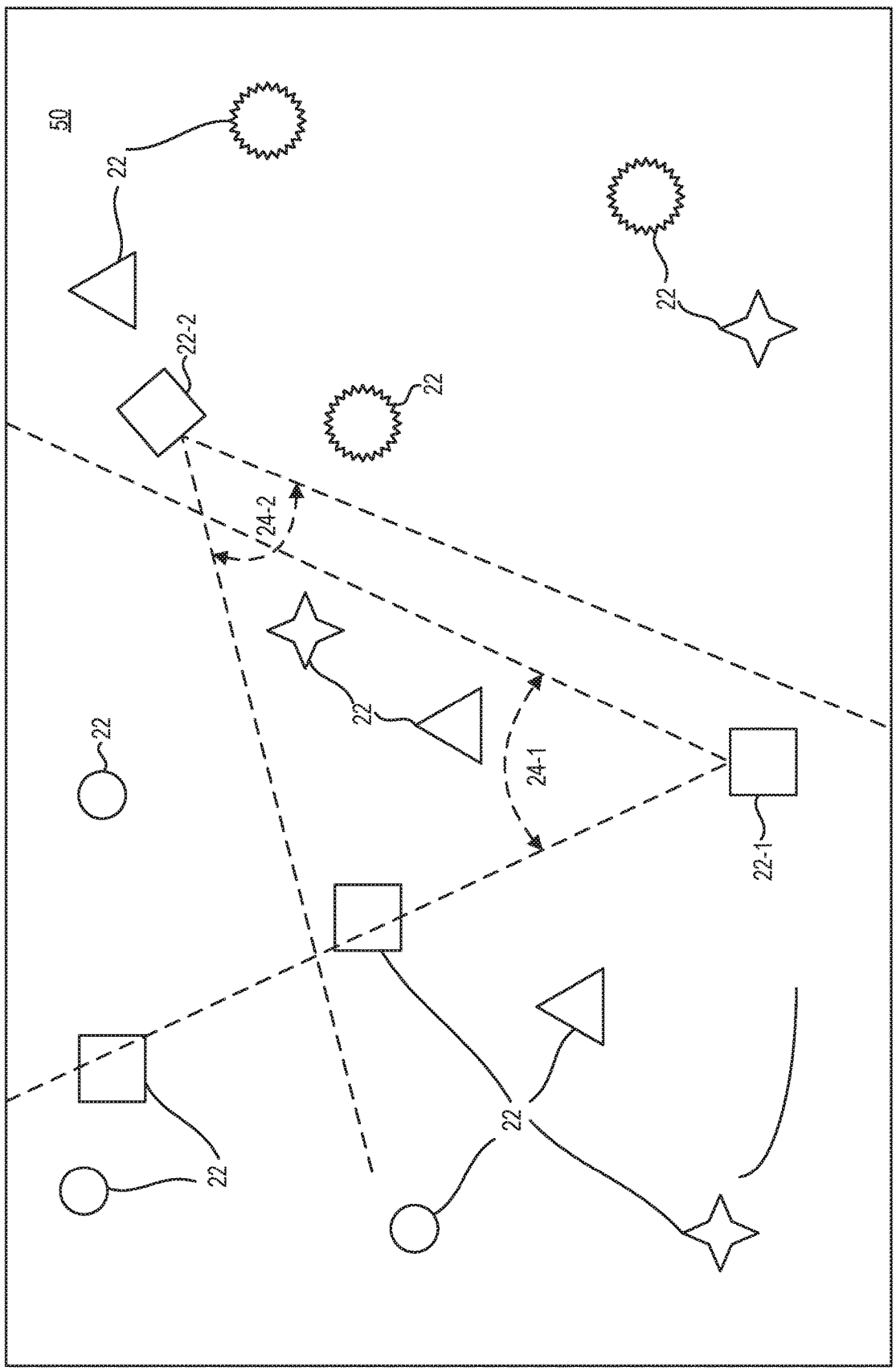
FIG. 2 is a plan view of a representation of a virtual environment at a particular instant in time according to one embodiment.

FIG. 2 is a plan view of a representation of a virtual environment 50 at a particular instant in time according to one embodiment. The virtual environment 50 includes the plurality of objects 22. While for purposes of illustration the virtual environment 50 is shown in two-dimensions, the virtual environment 50 is, in one embodiment, a three-dimensional virtual environment, and thus, the objects 22 may have locations identified with respect to a three-dimensional coordinate system. The virtual environment 50 is defined, as discussed previously, by the VEM 20 (FIG. 1). Certain of the objects 22, such as the objects 22-1, 22-2, have corresponding views 24 of the virtual environment 50. Note that solely for purposes of illustration the objects 22 are represented by various geometric shapes in FIG. 2, and such geometric shapes, in an actual simulation, may comprise any suitable objects in the simulation, such as rocks, trees, streams, tanks, cars, airplanes, or the like. Assume that the object 22-1 has the view 24-1 and that the object 22-2 has the view 24-2. As discussed with regard to FIG. 1, the view 24-2 at any particular instance in time is defined by the view data 26-2, and the view 24-1 is defined by the view data 26-1. For purposes of illustration, the portions of the virtual environment 50 within the views 24-1, 24-2 are identified via dashed lines. Accordingly, the objects 22 within the view 24-1 can be seen by the object 22-1, and the objects 22 within the view 24-2 can be seen by the object 22-2. Thus, at this particular instance in time, the object 22-1 cannot see the object 22-2, but the object 22-2 can see the object 22-1.

Figure 3:
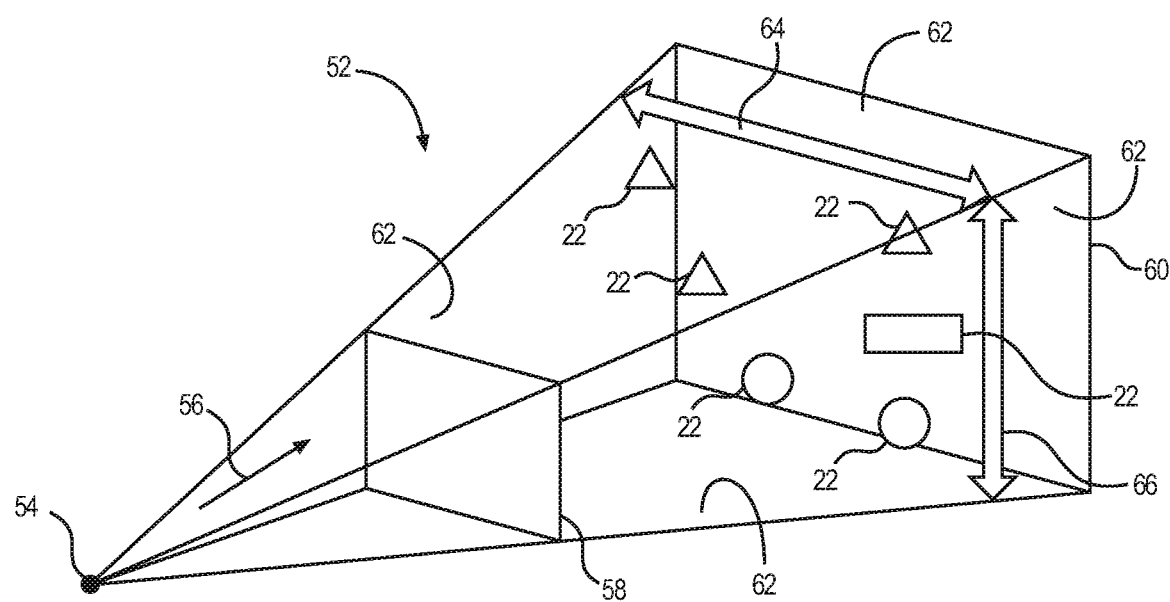
FIG. 3 is a block diagram of a view frustum and a plurality of objects in the virtual environment according to one embodiment.

The rendering system 30 (FIG. 1) utilizes a view frustum to determine what imagery within the virtual environment 50 is encompassed by a view 24 at a particular instance in time. FIG. 3 is a block diagram of a view frustum 52 according to one embodiment and of a plurality of objects 22 in the virtual environment 50. The view frustum 52 originates from a location 54 that is identified by the contents of the location ID field 28-1 of a view 24. If the view 24 is associated with an object 22, the location 54 changes if the object 22 associated with the respective view 24 moves about the virtual environment 50. Note that with respect to an observer view, as discussed above, the location 54 is not associated with any particular object 22.

The view frustum 52 extends in a view direction 56, which is defined by the contents of the view direction ID field 28-2. The view direction 56 may change as the corresponding object 22 alters the direction in which it is looking. The view frustum 52 may include a near plane 58, a far plane 60, and top, right, bottom, and left planes 62 that define a volume of the virtual environment 50. The top, right, bottom, and left planes 62 may be defined, for example, via a horizontal FOV 64 defined by the contents of the horizontal FOV ID field 28-3 of the corresponding view 24, and a vertical FOV 66 defined by the contents of the vertical FOV ID field 28-4 of the corresponding view 24. In some embodiments, the horizontal FOV ID field 28-3 and the vertical FOV ID field 28-4 may contain data that identifies the horizontal FOV and the vertical FOV in terms of degrees, for example.

To generate and display view images 32 that depict a view 24 at an instant in time, the rendering system 30 accesses the view data 26 associated with the respective view 24, intersects the VEM 20 with the view frustum 52 defined by the view data 26, and that portion of the virtual environment 50 that, according to the VEM 20 is within the volume of the view frustum 52, is rendered. This process may be repeated many times each second, such as 30, 60 or 120 times per second, so that changes in the virtual environment 50 are displayed substantially in real-time as such changes occur.

Referring again to FIG. 1, the rendering system 30 interacts with the GPU 31, as will be described in greater detail below, to generate the view images 32-1, 32-2 on a continuous basis during the simulation utilizing the view data 26-1, 26-2, the generation of view frustums, and the intersection with the view frustums with the VEM 20 many times per second. In this example, if the display devices 14-1, 14-2 are coupled to the computing device 12 (rather than the computing device 12-1), the GPU 31 outputs the view images 32-1, 32-2 directly to the display devices 14-1, 14-2 via a standard monitor connection, such as an HDMI cable, a DVI-D cable, or the like.

At some point in time, the user 46 may desire to see one of the views 24 on the output device 34-1. For example, the user 46 may be a trainer, and there may be tens of different users 18 participating in the simulation. The user 46 may desire to see what a particular user 18 is seeing at a particular instance in time. The user 46 initiates the controller application 36, which may present on a display device (not illustrated) the stream request UI 42.

Figure 4:
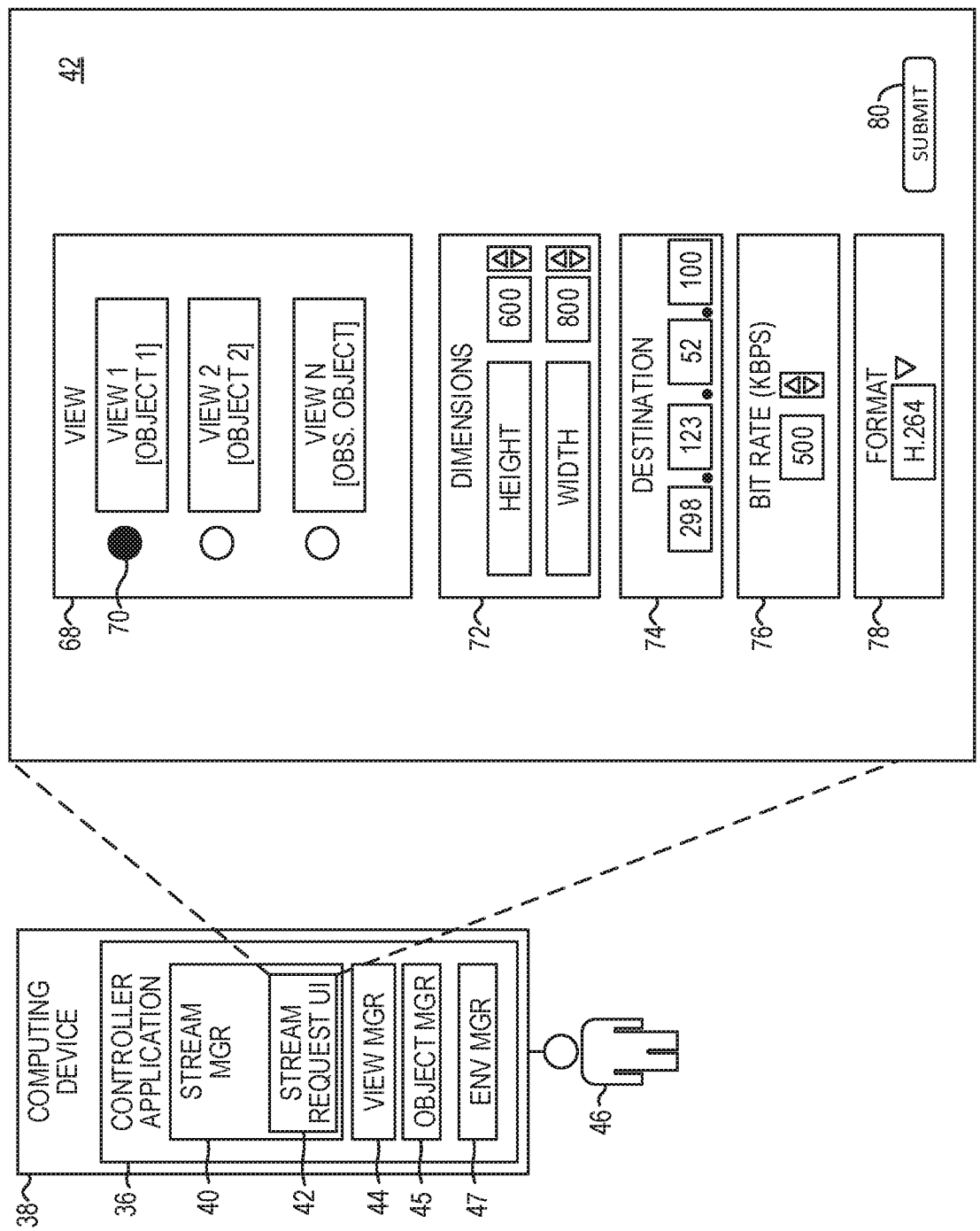
FIG. 4 is a block diagram of a user interface for creating a network view stream according to one embodiment.

FIG. 4 is a block diagram of the stream request UI 42 according to one embodiment. The stream request UI 42 includes a view control 68 that identifies the current views 24 that exist in the virtual environment at that instance in time. The view control 68 may also, for example, identify the respective object 22 that is associated with the view 24. The user 46 can select one of the views 24 via a radio button 70. In this example, the user 46 has selected the view 24-1 associated with the object 22-1. A dimensions control 72 allows the user 46 to identify a desired height and width of the stream images that will be sent to the output device 34-1. A destination control 74 allows the user 46 to identify the network address of the output device 34-1 using, in this example, an IP address. A bit rate control 76 allows the user 46 to specify a particular bit rate at which the images will be streamed to the output device 34-1. A format control 78 allows the user 46 to identify a particular encoding algorithm for the images that will be streamed to the output device 34-1.

After providing the requested information, the user 46 selects a submit control 80. The stream manager 40 receives the information and interacts with the simulation application 16 via the simulation API 35 to initiate a network view stream of the view 24-1 to the output device 34-1. In one example, the stream manager 40 generates and passes to the simulation API 35 a structure substantially similar to the structure presented below in Table 1, wherein the data fields of the structure contain the information provided by the user 46 via the stream request UI 42.

```
struct    SIMCONNECT_DATA_VIDEO_STREAM_
  INFO {
  char szSourceAddress[48];
  char szDestinationAddress[48];
  UINT uPort;
  UINT uWidth;
  UINT uHeight;
  UINT uFramerate;
  UINT uBitRate;
  UINT uFormat;
};
``` szSourceAddress
  IP Address of the video stream source. IPv4 address in standard dotted-decimal notation.
szDestinationAddress
  IP Address of the video stream destination. IPv4 address in standard dotted-decimal notation.
uPort
  Port of the video stream destination. This must be an even number. Source port will be (uPort −1).
uWidth
  Width of the video in pixels.
uHeight
  Height of the video in pixels.
uFramerate
  Target framerate to use for video encoding.
uBitRate
  Target bitrate (bps) to use for video encoding. Recommended range is 500,000-20,000,000.
uFormat
  Format to use for video encoding. Formats: 0—H.264.

Table 1

In combination, the stream manager 40, the view manager 44, the object manager 45, and the environment manager 47 allow the user 46 to generate a view 24 anywhere in the world, at any time, and in various weather conditions, and to stream the view 24 to a network-attached output device 34 that is located anywhere. Such views 24 may also be sent to a local display device 14, or not.

While solely for purposes of illustration the UIs of the stream manager 40, the view manager 44, the object manager 45, and the environment manager 47 have been discussed separately, in some embodiments the functionality can be integrated into a single UI, such that the user 46 can, with a single UI, generate a request to the simulation application 16 to generate a new object 22, generate a request to the simulation application 16 to generate a new view 24, and generate a request that the view 24 be streamed to a network-attached output device 34. These multiple requests may be sent together or separately to the simulation application 16.

Figure 5:
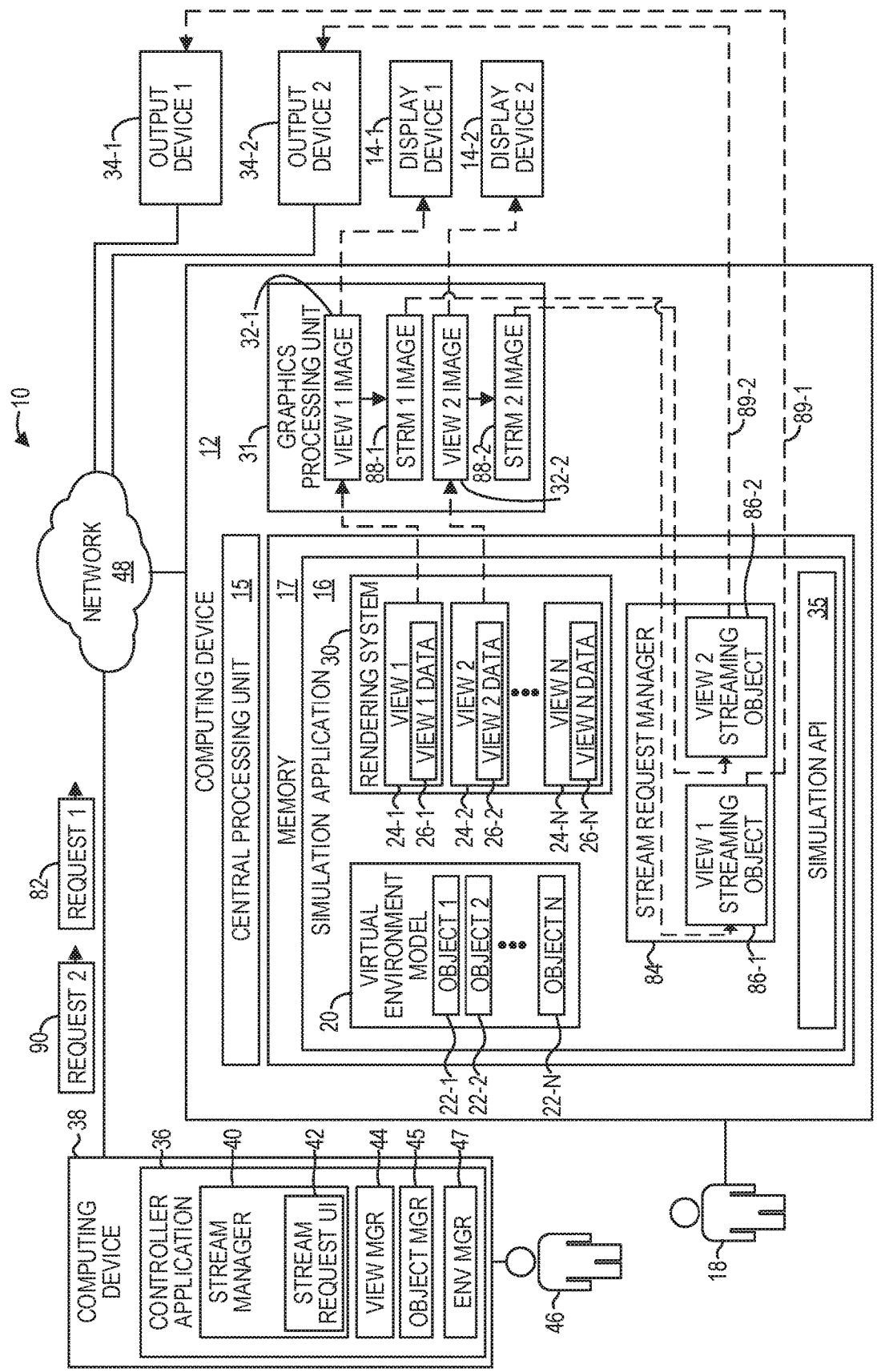
FIG. 5 is a block diagram of the system illustrated in FIG. 1 showing the generation of a plurality of network view streams according to one embodiment.

FIG. 5 is a block diagram of the system illustrated in FIG. 1 showing the generation of a plurality of network view streams according to one embodiment. In this example, assume that the user 46 initially uses the stream request UI 42 in a manner similar to the discussion above with regard to FIG. 4, to request a network stream view of the view 24-1. After receiving the information from the stream request UI 42, the stream manager 40 generates a request 82 that contains the information obtained via the stream request UI 42 and sends the information to the computing device 12 via the network 48. The request 82 may include, for example, the information formatted in the manner illustrated in Table 1. The simulation application 16 receives the request 82, identifies the request 82 as a request for a network view stream, and passes the request 82 to a stream request manager 84 of the simulation application 16.

The stream request manager 84 initiates a view streaming object 86-1 to handle the processing associated with generating a network view stream from the view 24-1. The stream request manager 84 communicates with the rendering system 30 to inform the rendering system 30 that for each view image 32-1 that is generated, a corresponding stream image 88-1 should be generated. The rendering system 30 then interacts with the GPU 31 so that after the GPU 31 generates each view image 32-1, the GPU 31 generates a stream image 88-1 from such view image 32-1. For example, the GPU 31 may reformat a view image 32-1 in accordance with the formatting information provided by the user 46 in the stream request UI 42 to generate the stream image 88-1. The view streaming object 86-1 obtains the stream image 88-1, and may additionally process each stream image 88-1 such as to encode the stream image 88-1 into a particular streaming format, such as an H.264 format. The view streaming object 86-1 then sends the stream image 88-1 to the output device 34-1 via the network 48 as part of a network stream 89-1 of stream images 88-1. The generation, processing, and sending of the stream images 88-1 may occur at the same rate as the generation and presentation of the view images 32-1, such as 30, 60 or 120 times a second, for example. In this manner, the user 46 can see, on the output device 34-1, the same imagery perceived by the user 18 on the display device 14-1.

The user 46 may then use the stream request UI 42 in a manner similar to the discussion above with regard to FIG. 4 to request a network stream view of the view 24-2. After receiving the information from the stream request UI 42, the stream manager 40 generates a request 90 that contains the information obtained via the stream request UI 42 and sends the information to the computing device 12 via the network 48. The request 90 may include, for example, the information formatted in the manner illustrated in Table 1. The simulation application 16 receives the request 90, identifies the request 90 as a request for a network view stream, and passes the request 90 to the stream request manager 84.

The stream request manager 84 initiates a view streaming object 86-2 to handle the processing associated with generating a network view stream from the view 24-2. The stream request manager 84 communicates with the rendering system 30 to inform the rendering system 30 that for each view image 32-2 that is generated, a corresponding stream image 88-2 should be generated. The rendering system 30 then interacts with the GPU 31 so that after the GPU 31 generates each view image 32-2, the GPU 31 generates a stream image 88-2 from such view image 32-2. The view streaming object 86-2 obtains the stream image 88-2, and may additionally process each stream image 88-2 such as to encode the stream image 88-2 into a particular streaming format, such as an H.264 format. The view streaming object 86-2 then sends the stream image 88-2 to the output device 34-2 via the network 48 as part of a network stream 89-2 of stream images 88-2. The generation, processing, and sending of the stream images 88-2 may occur at the same rate as the generation and presentation of the view images 32-2, such as 30, 60 or 120 times a second, for example. In this manner, the user 46 can see, on the output device 34-1, the same imagery perceived by the user 18 on the display device 14-1 while concurrently viewing on the output device 34-2 the same imagery perceived by the user 18 on the display device 14-2.

As discussed above, while for purposes of illustration the views 24-1 and 24-2 are illustrated as being associated with the same computing device 12, in other embodiments the user 46 may request network view streams of any number of views 24 associated with any number of different users 18 involved in the simulation. The user 18 may also direct multiple network view streams to the same output device 34-1, and each separate view stream can be presented in a separate window displayed on the output device 34-1.

It should be noted that the simulation application 16, solely for purposes of illustration, has been described as implementing the functionality described herein via a number of different processing functions, such as the rendering system 30, the simulation API 35, and the stream request manager 84. However, the embodiments are not limited to any particular number of processing functions, and the functionality described herein may be implemented with more or fewer than three different processing functions. Moreover, since the simulation application 16 is a component of the computing device 12, any functionality attributed to the simulation application 16, or a component thereof, may generally be attributed to the computing device 12 since the computing device 12 is a special purpose computing device when executing the simulation application 16. Wherein the simulation application 16 is implemented in executable instructions, any functionality attributed to the simulation application 16, or a component thereof, may generally be attributed to the central processing unit 15 since the executable instructions program the central processing unit 15 to operate in accordance with the functionality implemented in such executable instructions.

Figure 6:
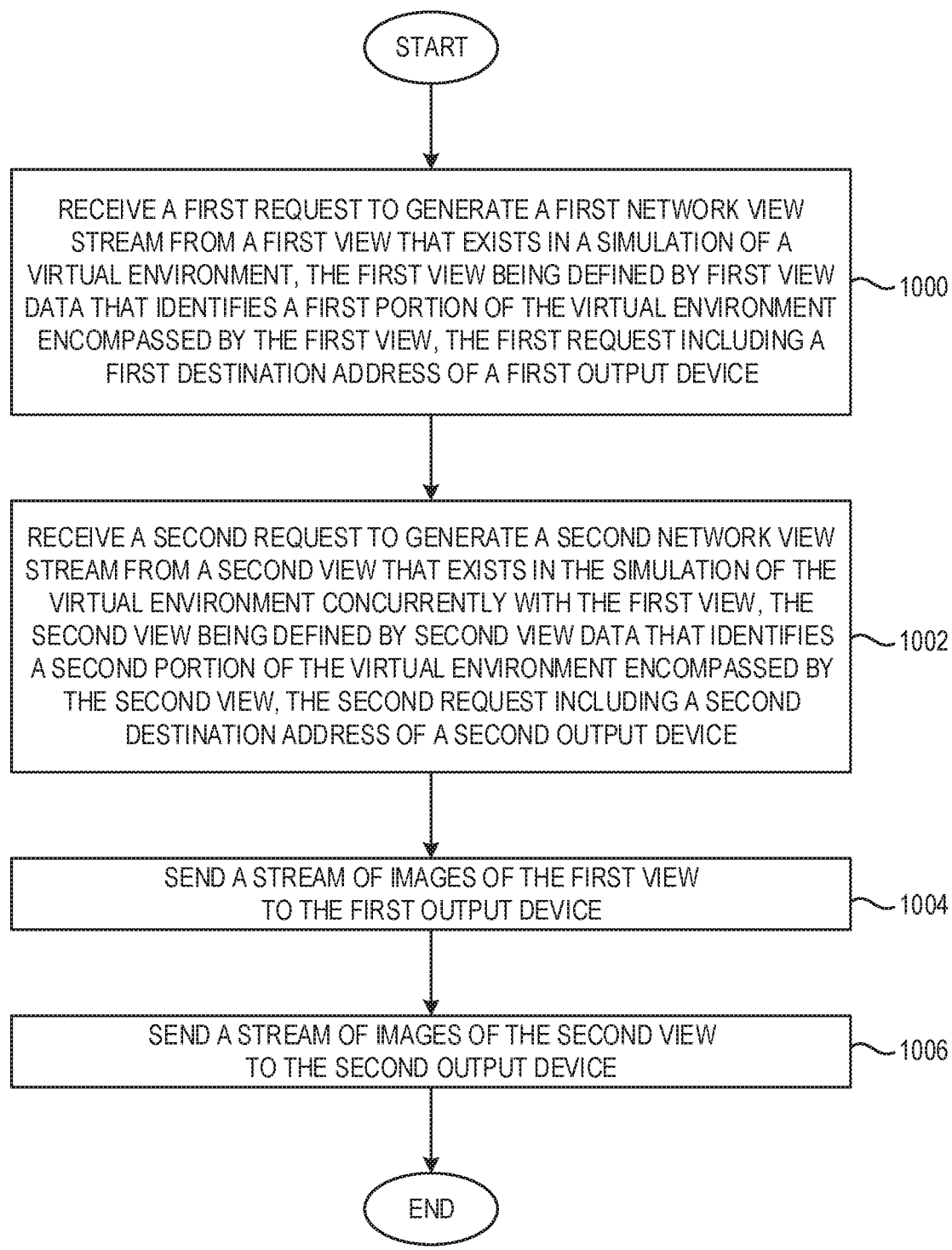
FIG. 6 is a flowchart of a method for streaming a view in a simulation according to one embodiment.

FIG. 6 is a flowchart of a method for streaming a view in a simulation according to one embodiment. FIG. 6 will be discussed in conjunction with FIG. 5. The computing device 12 receives a first request 82 to generate a first network view stream from the first view 24-1 that exists in the simulation of the virtual environment. The first view 24-1 is defined by first view data 26-1 that identifies a first portion of the virtual environment encompassed by the first view 24-1 and the first request 82 includes a first destination address of the first output device 34-1 (FIG. 6, block 1000).

The computing device 12 then receives a second request 90 to generate a second network view stream from the second view 24-2 that exists in the simulation of the virtual environment concurrently with the first view 24-1. The second view 24-2 is defined by second view data 26-2 that identifies a second portion of the virtual environment encompassed by the second view. The second request 90 includes a second destination address of the second output device 34-2 (FIG. 6, block 1002).

The computing device 12 sends the stream of stream images 88-1 of the first view 24-1 to the first output device 34-1, and sends the stream of stream images 88-2 of the second view 24-2 to the second output device 34-2 (FIG. 6, blocks 1004-1006).

FIGS. 7A-7E illustrate the processing associated with the generation of several view images 32 and corresponding stream images 88 over the course of several frames. Each frame corresponds to an instance in time in which a view image 32 is generated. Frames may be generated at a relatively rapid rate, such as 30, 60 or 120 times per second.

Figure 7A:
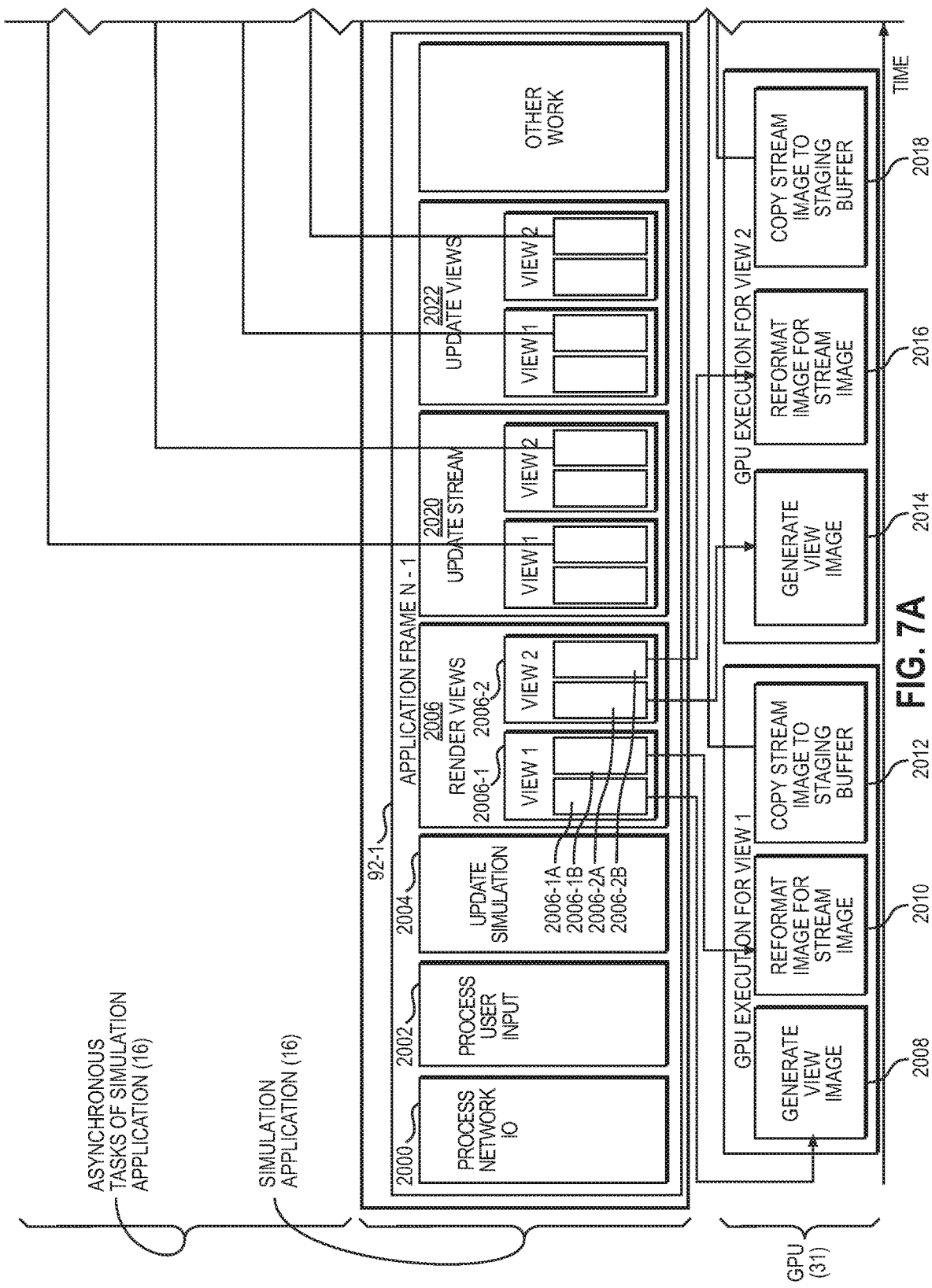

Starting with FIG. 7A, example processing associated with several frames 92-1-92-3 is illustrated. It is assumed that two network streams 89 have been generated, as discussed above with regard to FIG. 5. FIGS. 7A-7E start at a point in time after several frames have already been processed.

At the beginning of a timeframe associated with a frame 92-1, the simulation application 16 initially processes any network input/output (IO) (step 2000). The network IO may include, for example, movement data that identifies the movement of objects in the virtual environment performed on other computing devices. Such information is used to update the VEM 20 so that all users have a same, synchronized view of the virtual environment. The simulation application 16 then processes any user input, which may have been entered locally or from another computing device (step 2002). For example, the requests 82, 90 for network stream views of the views 24-1, 24-2, as described with regard to FIG. 5, may be initially processed in this step.

The simulation application 16 then updates the objects 22 (step 2004). For example, AI objects 22 may move, a collision between objects 22 may occur, an object 22 may be updated based on input from a participant in the simulation, or the like.

The simulation application 16 then performs a render view phase for each of the views 24-1, 24-2 (step 2006). The render view phase is based on data generated during the immediately previous frame. Thus, at this point, the simulation application 16 has a series of GPU operations suitable for submitting to the GPU 31 to render a view image 32-1 of the view 24-1 based on the state of the VEM 20 at the instant of time of the previous frame. The simulation application 16 submits the GPU operations to the GPU 31 (step 2006-1A). The GPU 31 renders a view image 32-1 (step 2008). The simulation application 16-1 then directs the GPU 31 to reformat the view image 32-1 to generate a network stream image 88-1 (step 2006-1B). The GPU 31 generates the network stream image 88-1 from the view image 32-1 (step 2010). For example, the view image 32-1 may be resized, inverted, and/or have a color format changed in order to generate the network stream image 88-1.

The GPU 31 copies the network stream image 88-1 to a staging buffer accessible by the simulation application 16 for use during a subsequent step (step 2012, see step 2046-1A for subsequent processing of the network stream image 88-1).

The simulation application 16 and the GPU 31 perform the same steps with regard to the view 24-2 (steps 2006-2A, 2006-2B, 2014, 2016, 2018). While in this embodiment a single GPU 31 is illustrated, in other embodiments the computing device 12 may have multiple GPUs 31. In such embodiments processing associated with multiple views can be performed concurrently on the multiple GPUs 31. For example, the processing described herein for the view 24-1 can be performed on one GPU 31, and the processing described herein for the view 24-2 can be performed on another GPU 31.

The simulation application 16 next updates the streams of the network streams 89-1, 89-2 with the network stream images 88-1, 88-2 from a previous frame (step 2020). Briefly, the network stream images 88-1, 88-2 from the previous frame are encoded and sent to the output devices 34-1, 34-2 (steps 2024, 2026). However, a more detailed discussion regarding the processing associated with the updating of the network streams 89-1, 89-2 will be discussed in greater detail with regard to a subsequent frame. The simulation application 16 next updates the views 24-1, 24-2 (step 2022). For the view 24-1, the simulation application 16 generates a view frustum based on the view data 26-1. The simulation application 16 then intersects the VEM 20 to determine what would be within the view 24-1 at that instant in time. For each object within the view 24-1 based on the view frustum, the simulation application 16 generate or updates visualization data, sometimes referred to as renderables. The renderables may include, for example, mesh data (e.g., geometry of object), material data (e.g., color, transparency, lighting info), and texture data (e.g., images that can be mapped to the surface of the object). The simulation application 16 does the same processing for the view 24-2.

The simulation application 16 then passes the visualization data for each view 24-1, 24-2 to an asynchronous task running on a background thread. The asynchronous task utilizes the visualization data to optimize the data for the GPU 31 for each of the views 24-1, 24-2 (steps 2028, 2030). This may involve, for example, converting the renderables into GPU operations for the GPU 31 which contain buffer bindings (for vertex, index, and texture data), state bindings (hardware state to set to the GPU), shader bindings (identifies which programs to run for this operation), and operation type (e.g., draw call, buffer copy, and the like).

While the asynchronous tasks are optimizing the visualization data and encoding the stream images, the simulation application 16 may perform other work, such as, by way of non-limiting example, scripting, processing of cockpit panels and gauges, sound processing, and the like.

Figure 7B:
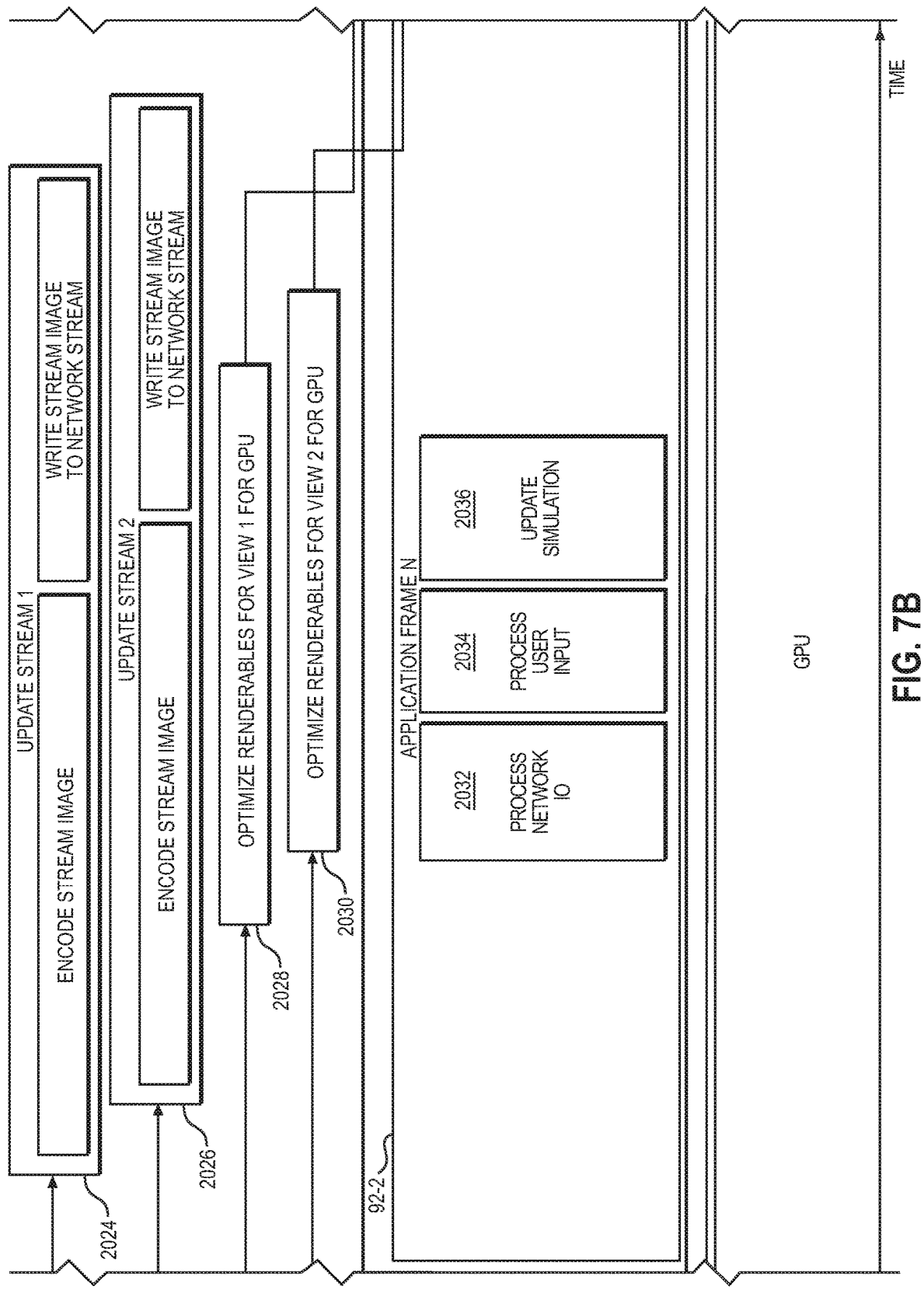

FIG. 7B illustrates the time frame associated with a next frame 92-2 of the simulation. The simulation application 16 again performs the process network IO, process user input, and update simulation steps as discussed with regard to steps 2000, 2002, 2004 during the frame 92-1 (steps 2032, 2034, 2036).

Figure 7C:
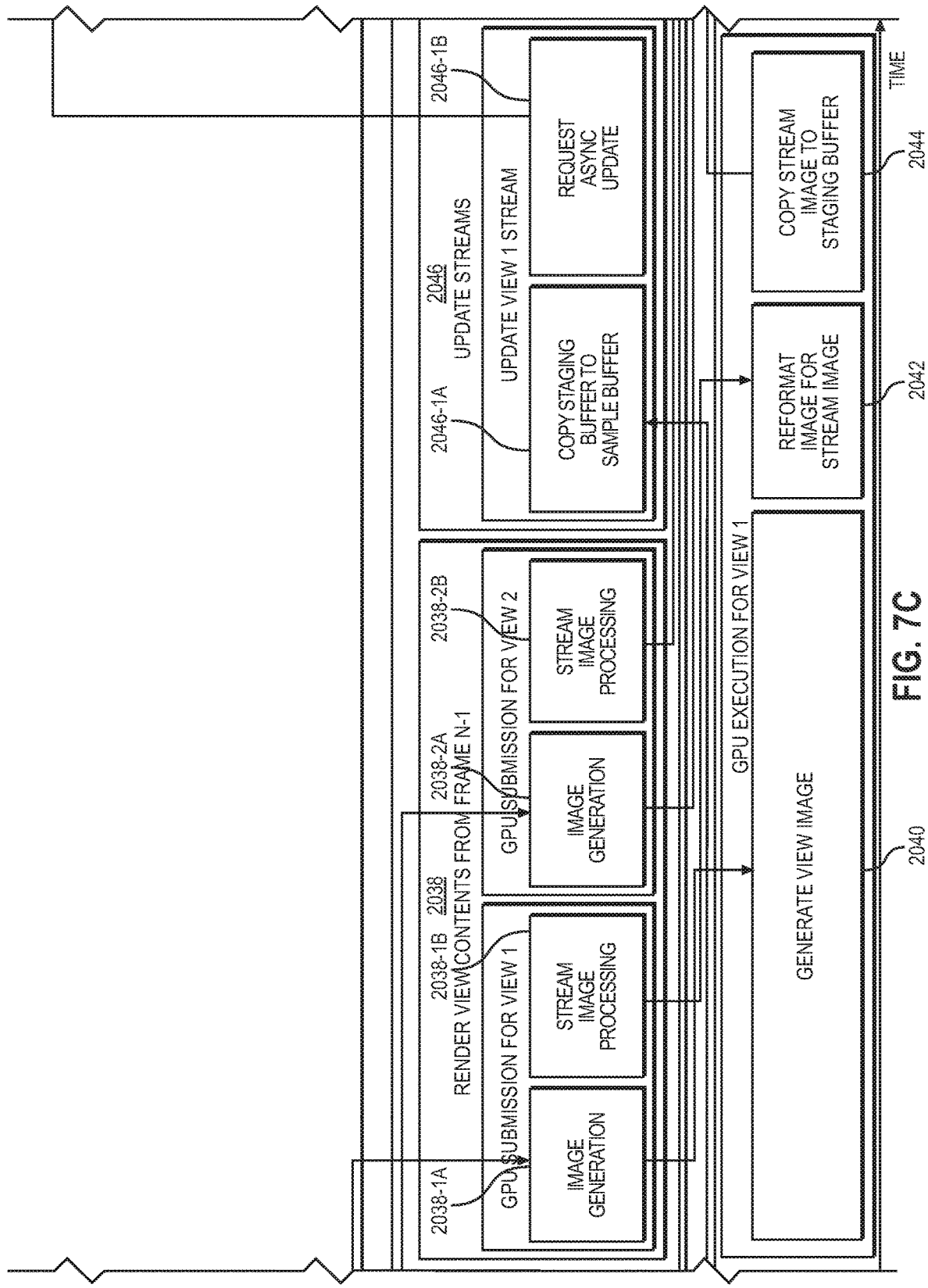

Referring now to FIG. 7C, the simulation application 16 again performs a render view phase for each of the views 24-1, 24-2 (step 2038). For the view 24-1, the simulation application 16 receives the optimized GPU operations for the view 24-1 generated in step 2028, and submits the optimized GPU operations to the GPU 31 to generate a view image 32-1 (step 2038-1A). The GPU 31 performs the same processing as described previously with regard to steps 2008, 2010, 2012 (steps 2040, 2042, 2044). The simulation application 16-1 then directs the GPU 31 to reformat the view image 32-1 to generate a network stream image 88-1 (step 2038-1B). The simulation application 16 performs the same processing for the view 24-2 (steps 2038-2A, 2038-2B).

The simulation application 16 next updates the streams of the network streams 89-1, 89-2 with the network stream images 88-1, 88-2 from the previous frame 92-1 (step 2046). In particular, for the view 24-1, the simulation application 16 accesses the network stream image 88-1 generated in step 2010 and stored in the staging buffer in step 2012, and copies the staging buffer to a sampling buffer (step 2046-1A). The simulation application 16 then requests an asynchronous update (step 2046-1B).

Figure 7D:
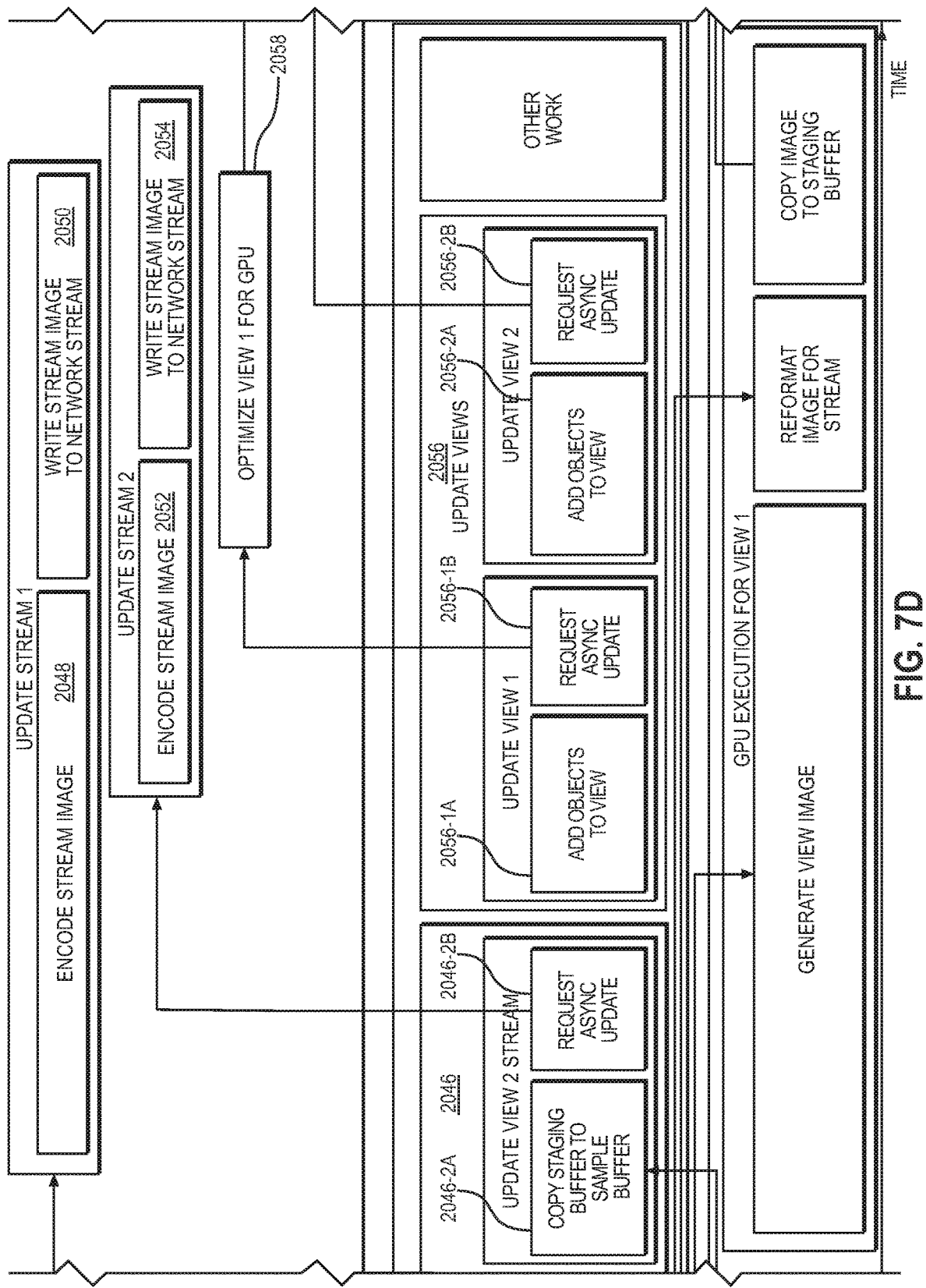

Referring now to FIG. 7D, the request for an asynchronous update causes an asynchronous task, such as the view streaming object 86-1, to obtain the network stream image 88-1 from the sample buffer and to encode the network stream image 88-1 according to a desired encoding format, such as the H.264 format (step 2048). The view streaming object 86-1 then sends the encoded network stream image 88-1 to the output device 34-1 as part of the network stream 89-1 of stream images 88-1 (step 2050).

Similarly, for the view 24-2, the simulation application 16 accesses the network stream image 88-2 generated in step 2016 and stored in the staging buffer in step 2018, and copies the staging buffer to a sampling buffer (step 2046-2A). The simulation application 16 then requests an asynchronous update (step 2046-2B). The request for an asynchronous update causes an asynchronous task, such as the view streaming object 86-2, to obtain the network stream image 88-2 from the sample buffer and to encode the network stream image 88-2 according to a desired encoding format, such as the H.264 format (step 2052). The view streaming object 86-2 then sends the encoded network stream image 88-2 to the output device 34-2 as part of the network stream 89-2 of stream images 88-2 (step 2054).

The simulation application 16 next updates the views 24-1, 24-2 (2056). For the view 24-1, the simulation application 16 adds objects to the view 24-1 by generating a view frustum based on the view data 26-1, and intersecting the VEM 20 to determine what would be within the view 24-1 at that instant in time (step 2056-1A). For each object within the view 24-1 based on the view frustum, the simulation application 16 generates or updates the visualization data (i.e., the renderables). The simulation application 16 then requests an asynchronous update to pass the visualization data for the view 24-1 to an asynchronous task running on a background thread (step 2056-1B). The asynchronous task utilizes the visualization data to optimize the data for the GPU 31 for each of the views 24-1, 24-2 as discussed with regard to steps 2028, 2030 (step 2058). The simulation application 16 performs analogous processing for the view 24-2 (steps 2056-2A, 2056-2B).

FIG. 7E illustrates the processing of a next frame 92-3. The processing of the frame 92-3 would be substantially similar to the processing of frames 92-1, 92-2, and for purposes of brevity is not described herein.

Figure 8:
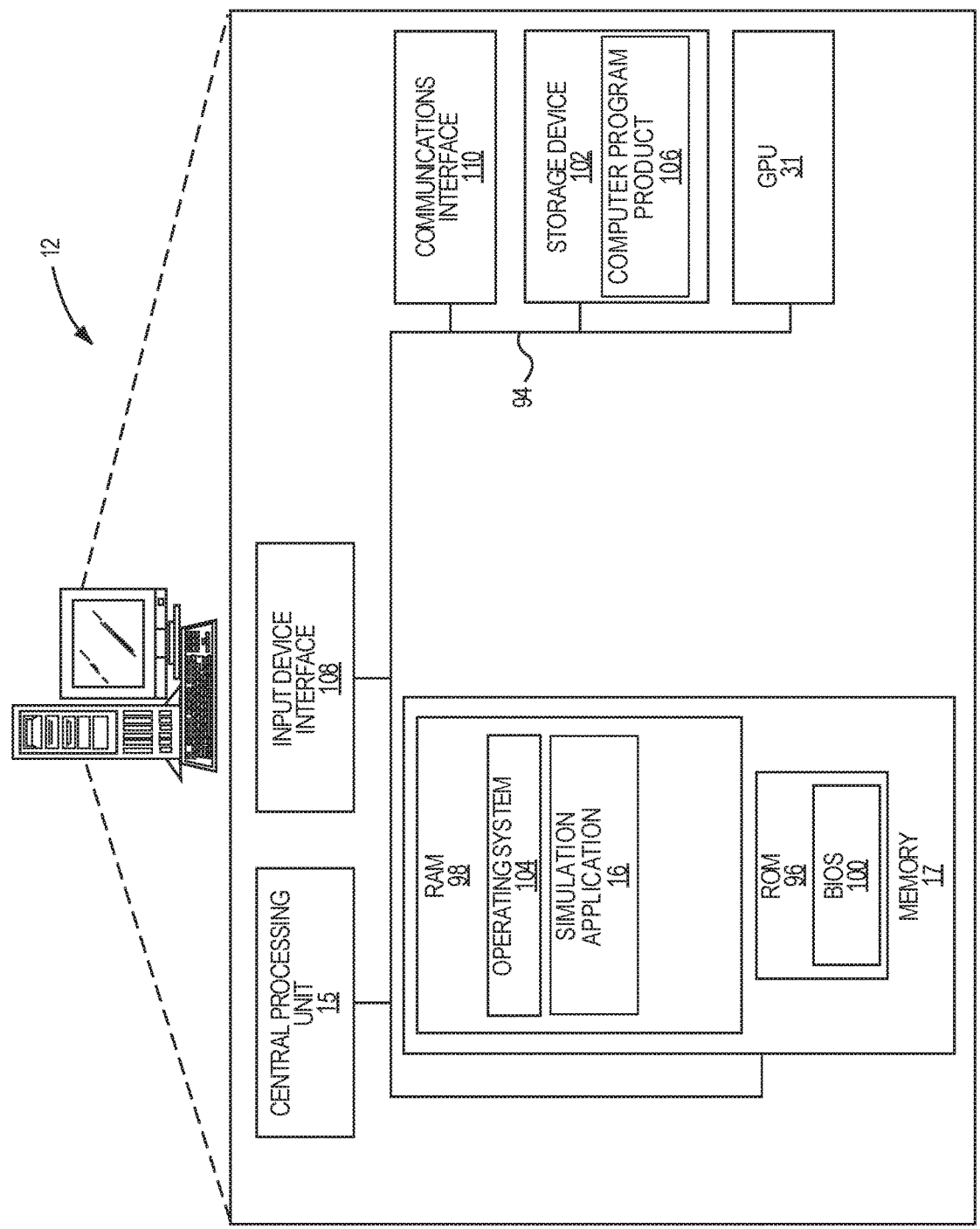
FIG. 8 is a block diagram of a computing device suitable for implementing embodiments disclosed herein.

FIG. 8 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the central processing unit 15, the memory 17, and a system bus 94. The system bus 94 provides an interface for system components including, but not limited to, the memory 17 and the central processing unit 15. The central processing unit 15 can be any commercially available or proprietary processor.

The memory 17 may include non-volatile memory 96 (e.g., read-only memory (ROM), erasable programmable read-only memory (EPROM), electrically erasable programmable read-only memory (EEPROM), etc.), and volatile memory 98 (e.g., random-access memory (RAM)). A basic input/output system (BIOS) 100 may be stored in the non-volatile memory 96 and can include the basic routines that help to transfer information between elements within the computing device 12. The volatile memory 98 may also include a high-speed RAM, such as static RAM, for caching data.

The computing device 12 may further include or be coupled to a non-transitory computer-readable storage medium such as a storage device 102, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 102 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 102 and in the volatile memory 98, including an operating system 104 and the simulation application 16, which may implement the functionality described herein in whole or in part.

All or a portion of the examples may be implemented as a computer program product 106 stored on a transitory or non-transitory computer-usable or computer-readable storage medium, such as the storage device 102, which includes complex programming instructions, such as complex computer-readable program code, to cause the central processing unit 15 to carry out the steps described herein. Thus, the computer-readable program code can comprise software instructions for implementing the functionality of the examples described herein when executed on the central processing unit 15. The central processing unit 15, in conjunction with the simulation application 16 in the volatile memory 98, may serve as a controller, or control system, for the computing device 12 that is to implement the functionality described herein.

An operator, such as the user 18, may also be able to enter input through a keyboard (not illustrated) or a pointing device such as a mouse (not illustrated). Such input devices may be connected to the central processing unit 15 through an input device interface 108 that is coupled to the system bus 94 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 110 suitable for communicating with the network 48 as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method for streaming a view in a simulation, comprising:
   executing, by a computing device comprising a central processing unit and a graphics processing unit (GPU), a simulation application to provide a simulation of a virtual environment;
   receiving, by the computing device, a first request to generate a first network view stream from a first view that exists in the simulation of the virtual environment, the first view being defined by first view data that identifies a first portion of the virtual environment encompassed by the first view, the first request including a first destination address of a first output device;
   receiving, by the computing device, a second request to generate a second network view stream from a second view that exists in the simulation of the virtual environment concurrently with the first view, the second view being defined by second view data that identifies a second portion of the virtual environment encompassed by the second view, the second request including a second destination address of a second output device;
   sending, by the computing device, a stream of images of the first view to the first output device via a network, wherein sending the stream of images of the first view comprises rendering, by the GPU of the computing device, the stream of images of the first view; and
   sending, by the computing device, a stream of images of the second view to the second output device via the network, wherein sending the stream of images of the second view comprises rendering, by the GPU of the computing device, the stream of images of the second view.

2. The method of claim 1, wherein sending the stream of images of the first view to the first output device comprises:
   iteratively, for each frame of a plurality of frames at a frame rate:

generating a first view image based on the first view data;
generating a first stream image based on the first view image;
sending the first view image to a first display device; and
sending the first stream image as one of the stream of images of the first view to the first output device.

3. The method of claim 2, wherein sending the stream of images of the second view to the second output device comprises:
iteratively, for each frame of the plurality of frames at the frame rate:
generating a second view image based on the second view data;
generating a second stream image based on the second view image;
sending the second view image to a second display device; and
sending the second stream image as one of the stream of images of the second view to the second output device.

4. The method of claim 1, further comprising:
after an initiation of the simulation, receiving a request to generate the first view in the simulation of the virtual environment, the request to generate the first view including location information that identifies a location of the first view and direction information that identifies a direction of the first view; and
generating the first view in the simulation prior to sending the stream of images of the first view to the first output device.

5. The method of claim 4, wherein the request to generate the first view includes an object identifier of an object in the simulation to which the first view is attached.

6. The method of claim 4, further comprising:
after the initiation of the simulation, receiving a request to generate the second view in the simulation of the virtual environment, the request to generate the second view including location information that identifies a location of the second view and direction information that identifies a direction of the second view; and
generating the second view in the simulation prior to sending the stream of images of the second view to the second output device.

7. The method of claim 4, wherein sending the stream of images of the first view to the first output device comprises:
iteratively, for each frame of a plurality of frames at a frame rate:
generating a first view image based on the first view data;
generating a first stream image based on the first view image;
sending the first stream image as one of the stream of images of the first view to the first output device; and
discarding the first view image without sending the first view image to any device for presentation.

8. The method of claim 1, wherein the first request includes formatting data that identifies a stream image height and a stream image width.

9. The method of claim 8, wherein sending the stream of images of the first view to the first output device comprises:
iteratively, for each frame of a plurality of frames at a frame rate:
generating a first view image based on the first view data, the first view image having a first view image height and a first view image width;
generating a first stream image based on the first view image, the first stream image having a first stream image height and a first stream image width that differs from the first view image height and the first view image width; and
sending the first stream image as one of the stream of images of the first view to the first output device.

10. The method of claim 1, wherein sending the stream of images of the first view to the first output device further comprises:
generating a data structure for rendering the first view image;
directing the GPU to generate the first view image and the first stream image based on the first view image, the first stream image including resolution attributes that differ from the first view image;
receiving the first stream image from the GPU; and
sending the first stream image to the first output device.

11. A computing device comprising:
a communications interface; and
a central processing unit coupled to the communications interface and configured to:
execute a simulation application to provide a simulation of a virtual environment;
receive a first request to generate a first network view stream from a first view that exists in the simulation of the virtual environment, the first view being defined by first view data that identifies a first portion of the virtual environment encompassed by the first view, the first request including a first destination address of a first output device;
receive a second request to generate a second network view stream from a second view that exists in the simulation of the virtual environment concurrently with the first view, the second view being defined by second view data that identifies a second portion of the virtual environment encompassed by the second view, the second request including a second destination address of a second output device;
send a stream of images of the first view to the first output device via a network; and
send a stream of images of the second view to the second output device via the network.

12. The computing device of claim 11, wherein to send the stream of images of the first view to the first output device, the central processing unit is further configured to:
iteratively, for each frame of a plurality of frames at a frame rate:
generate a first view image based on the first view data;
generate a first stream image based on the first view image;
send the first view image to a first display device; and
send the first stream image as one of the stream of images of the first view to the first output device.

13. The computing device of claim 12, wherein to send the stream of images of the second view to the second output device, the central processing unit is further configured to:
iteratively, for each frame of the plurality of frames at the frame rate:
generate a second view image based on the second view data;
generate a second stream image based on the second view image;
send the second view image to a second display device; and send the second stream image as one of the stream of images of the second view to the second output device.

14. The computing device of claim 11, wherein the central processing unit is further configured to:
    after an initiation of the simulation, receive a request to generate the first view in the simulation of the virtual environment, the request to generate the first view including location information that identifies a location of the first view and direction information that identifies a direction of the first view; and
    generate the first view in the simulation prior to sending the stream of images of the first view to the first output device.

15. The computing device of claim 14, wherein the central processing unit is further configured to:
    after the initiation of the simulation, receive a request to generate the second view in the simulation of the virtual environment, the request to generate the second view including location information that identifies a location of the second view and direction information that identifies a direction of the second view; and
    generate the second view in the simulation prior to sending the stream of images of the second view to the second output device.

16. A computer program product stored on a non-transitory computer-readable storage medium and including instructions to cause a central processing unit to:
    execute a simulation application to provide a simulation of a virtual environment;
    receive a first request to generate a first network view stream from a first view that exists in the simulation of the virtual environment, the first view being defined by first view data that identifies a first portion of the virtual environment encompassed by the first view, the first request including a first destination address of a first output device;
    receive a second request to generate a second network view stream from a second view that exists in the simulation of the virtual environment concurrently with the first view, the second view being defined by second view data that identifies a second portion of the virtual environment encompassed by the second view, the second request including a second destination address of a second output device;
    send a stream of images of the first view to the first output device via a network; and
    send a stream of images of the second view to the second output device via the network.

17. The computer program product of claim 16, wherein to send the stream of images of the first view to the first output device, the instructions are further configured to cause the central processing unit to:
    iteratively, for each frame of a plurality of frames at a frame rate:
        generate a first view image based on the first view data;
        generate a first stream image based on the first view image;
        send the first view image to a first display device; and
        send the first stream image as one of the stream of images of the first view to the first output device.

18. The computer program product of claim 17, wherein to send the stream of images of the second view to the second output device, the instructions are further configured to cause the central processing unit to:
    iteratively, for each frame of the plurality of frames at the frame rate:
        generate a second view image based on the second view data;
        generate a second stream image based on the second view image;
        send the second view image to a second display device; and
        send the second stream image as one of the stream of images of the second view to the second output device.

19. The computer program product of claim 16, wherein the instructions further cause the central processing unit to:
    after an initiation of the simulation, receive a request to generate the first view in the simulation of the virtual environment, the request to generate the first view including location information that identifies a location of the first view and direction information that identifies a direction of the first view; and
    generate the first view in the simulation prior to sending the stream of images of the first view to the first output device.

20. The computer program product of claim 16, wherein to send the stream of images of the first view to the first output device, the instructions are further configured to cause the central processing unit to:
    generate a data structure for rendering the first view image;
    direct a graphics processing unit (GPU) to generate the first view image and the first stream image based on the first view image, the first stream image including resolution attributes that differ from the first view image;
    receive the first stream image from the GPU; and
    send the first stream image to the first output device.

* * * * *